United States Patent
Chon

(10) Patent No.: US 9,836,871 B2
(45) Date of Patent: Dec. 5, 2017

(54) THREE-DIMENTIONAL PLANE PANORAMA CREATION THROUGH HOUGH-BASED LINE DETECTION

(71) Applicant: Earthmine, Inc., Berkeley, CA (US)

(72) Inventor: Jaechoon Chon, Albany, CA (US)

(73) Assignee: HERE Global B.V., Eindhoven (NL)

( * ) Notice: Subject to any disclaimer, the term of this patent is extended or adjusted under 35 U.S.C. 154(b) by 172 days.

(21) Appl. No.: 14/419,204

(22) PCT Filed: Jul. 30, 2013

(86) PCT No.: PCT/IB2013/056239
§ 371 (c)(1),
(2) Date: Feb. 2, 2015

(87) PCT Pub. No.: WO2014/020529
PCT Pub. Date: Feb. 6, 2014

(65) Prior Publication Data
US 2015/0199839 A1    Jul. 16, 2015

Related U.S. Application Data

(60) Provisional application No. 61/679,006, filed on Aug. 2, 2012.

(51) Int. Cl.
*G06T 15/08* (2011.01)
*G06T 3/00* (2006.01)
(Continued)

(52) U.S. Cl.
CPC ............ *G06T 15/08* (2013.01); *G06K 9/4633* (2013.01); *G06T 3/0037* (2013.01);
(Continued)

(58) Field of Classification Search
CPC ..... G06T 15/08; G06T 3/0062; G06T 3/0037; G06T 17/05; G06T 7/0028;
(Continued)

(56) References Cited

U.S. PATENT DOCUMENTS

2013/0282208 A1* 10/2013 Mendez-Rodriguez ............................. G01S 17/89 701/16
2014/0035906 A1    2/2014 Ranjan et al.

FOREIGN PATENT DOCUMENTS

WO    2009-143986    12/2009

OTHER PUBLICATIONS

Okorn, Brian, et al. "Toward automated modeling of floor plans." Proceedings of the symposium on 3D data processing, visualization and transmission. vol. 2. 2010.*

(Continued)

*Primary Examiner* — Mark Zimmerman
*Assistant Examiner* — Nurun N Flora
(74) *Attorney, Agent, or Firm* — Lempia Summerfield Katz LLC

(57) ABSTRACT

A method for creating a plane panorama from point cloud data using Hough transformations is disclosed. The method involves converting the three-dimensional point cloud into a two-dimensional histogram with bins grouping neighboring points, and performing a Hough transformation on the histogram. The resulting transformed data is segmented and the method searches the segments iteratively for a major line, followed by lines that are orthogonal, diagonal, or parallel to the major line, and discards outlying data in each bin as lines are identified. The detected lines are connected to form planes, and the planes are assembled into a hole- and gap-filled panorama. The method may also use an algorithm such as a Random Sample Consensus (RANSAC) algorithm to detect a ground plane.

15 Claims, 11 Drawing Sheets

(51) Int. Cl.
*G06K 9/46* (2006.01)
*G06T 17/05* (2011.01)
*G06T 7/00* (2017.01)
*G06T 7/33* (2017.01)

(52) U.S. Cl.
CPC .............. *G06T 3/0062* (2013.01); *G06T 7/33* (2017.01); *G06T 17/05* (2013.01); *G06T 2200/08* (2013.01); *G06T 2207/10028* (2013.01); *G06T 2207/20061* (2013.01); *G06T 2207/30184* (2013.01); *G06T 2210/56* (2013.01)

(58) Field of Classification Search
CPC ....... G06T 2210/56; G06T 2207/20061; G06T 2207/10028; G06T 2207/30184; G06T 2200/08; G06K 9/4633
See application file for complete search history.

(56) References Cited

OTHER PUBLICATIONS

Brian in view of R. Schnabel, R. Wahl, and R. Klein, "Efficient RANSAC for Point-Cloud Shape Detection," Computer Graphics Forum, vol. 26, No. 2, pp. 214-226, Jun. 2007.* https://web.archive.org/web/20110413113615/http://en.wikipedia.org/wiki/Hough_transform; herein after Wiki_Hough.* http://vision.stanford.edu/teaching/cs231a_autumn1112/lecture/lecture4_edges_lines_cs231a_marked.pdf. Oct 10, 2011.*

Written Opinion and IPEA, Application No. PCT/IB2013/056239dated, Feb. 3, 2015, pp. 1-9.

Brian Okorn, et al. "Toward Automated Modeling of Floor Plans", Proceedings of the Symposium on 3D Data Processing, Visualization and Transmission, 2010, Espace Saint Martin. Paris, France. XP055089590.

Chris Engels, et al: "Automatic Occlusion Removal from Facades for 3D Urban Reconstruction", Advances concepts for intelligent vision systems, springer Berlin Heidelberg, Berlin. pp. 681-692.

Dorit Borrmann, et al., The 3D Hough Transform for plane detection in point clouds: A review and a new accumulator design, Jun. 1, 2011.

Dragomir Anguelov et al., Google Street View: Capturing the World at Street Level, 2010, pp. 32-38, IEEE Computer Society.

Eunyoung Kim, et al., Robot and Human Interative Communication, Planar Patch based 3D Environment Modeling with Stereo Camera, Aug. 27, 2007, pp. 516-521.

Gordon Petrie, An Introduction to the Technology-Mobile Mapping Systems, Jan./Feb. 2010, pp. 35-43, GEO Informatics.

* cited by examiner

US 9,836,871 B2

THREE-DIMENTIONAL PLANE PANORAMA CREATION THROUGH HOUGH-BASED LINE DETECTION

CROSS-REFERENCE TO OTHER APPLICATIONS

This application claims the benefit of the filing date under 35 U.S.C. §119(e) of U.S. Provisional Application Ser. No. 61/679,006 filed Aug. 2, 2012, the entire disclosure of which is hereby incorporated by reference.

In addition, U.S. Provisional Patent Application Nos. 61/679,009 filed on the Aug. 2, 2012 and 61/683,342 filed on the Aug. 15, 2012, entitled "Plane Panorama Location Correction in Three-Dimensional Mapping," and the U.S. Non-provisional Application entitled "Plane Panorama Location Correction in Three-Dimensional Mapping," filed on Jul. 30, 2013 are incorporated by reference in their entirety.

BACKGROUND

In general, the disclosure relates to assembling accurate, machine-intelligible, three-dimensional panoramas, and more particularly, to detecting lines and intersecting planes through two-dimensional Hough transforms.

Street-level spatial maps provide a user with a panoramic, three-dimensional map of an area, typically from the perspective of a human on the ground. Besides being of general interest, these kinds of maps can help drivers to appreciate the nuances of a driving route, or to understand what important landmarks actually look like. If the mapping data is accurate enough, three-dimensional panoramic maps can allow property tax assessors, land appraisers, and real estate professionals to do their work quickly, often eliminating the need for at least some types of site visits. Detailed spatial information can also be used to improve emergency service response times and to plan and implement disaster relief efforts, to name but a few applications.

Unfortunately, gathering detailed spatial data is a laborious process. In a typical process, a vehicle with an imaging system and a positioning or navigation system traverses roads and waterways, taking photographs and, in some cases, range measurements as it goes. Typically, the imaging system includes a camera mast mounted on a motor vehicle. The camera mast has a number of cameras on it, and may also include one or more laser systems for gathering ranging data. The navigation system typically includes a global positioning system (GPS) receiver to provide the vehicle's absolute position in space, and may also include a traditional gyroscope-based inertial navigation system, as well as encoders (i.e., sensors) on the vehicle wheels to measure relative position.

The use of a laser ranging system provides highly accurate range data. While it is possible to gather accurate range data by using stereoscopic camera systems, range data gathered by these methods can include more noise and present additional processing challenges.

SUMMARY

One aspect relates to methods for assembling plane panoramas from point cloud data. A ground plane is first detected in the point cloud data using an algorithm such as a Random Sample Consensus (RANSAC) algorithm. The point cloud data may then be transformed into an absolute position coordinate system and converted from a three-dimensional point cloud into a two-dimensional histogram with bins grouping neighboring points. A Hough transformation is performed on the two-dimensional histogram. The resulting transformed data is segmented and the method searches the segments iteratively for a major line, followed by lines that are orthogonal, diagonal, or parallel to the major line, and discards outlying data in each bin as lines are identified. The detected lines are connected to form planes, and the planes are assembled into a hole- and gap-filled panorama.

Other aspects, features, and advantages are set forth in the description that follows.

BRIEF DESCRIPTION OF THE DRAWING FIGURES

DETAILED DESCRIPTION

Once raw spatial data is gathered by a camera-and-ranging system, the next difficulty in mapping that data lies in converting the raw data into a useable form. In raw form, the spatial data is a "cloud" of points, i.e., the individual pixels of each image taken by the cameras and, if available, the data points from the laser ranging system. Initially, a machine generally has no data indicative of which points in that point cloud relate to which other points.

In order to be more readily useable, the raw data is transformed into a three-dimensional scene constructed from a number of defined planes. Planes are assembled from the "cloud" of points.

Figure 1:
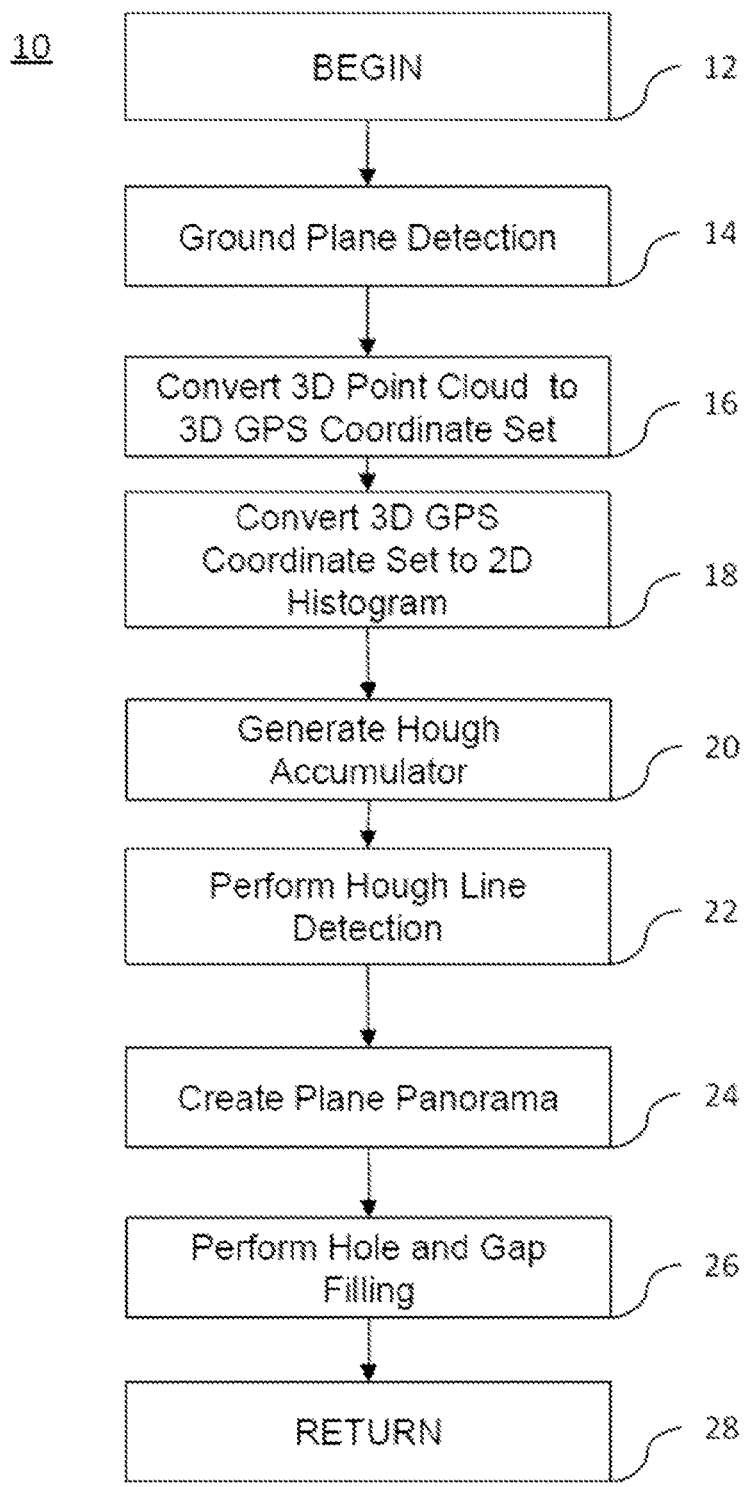
FIG. 1 is a high-level flow diagram of a method for three-dimensional plane panorama creation through Hough-based line detection.

FIG. 1 is a high level flow diagram illustrating tasks in an integrated method, generally indicated at 10, for creating three-dimensional plane panoramas through Hough-based line detection. The tasks of method 10 may be performed using a general purpose computing system, and the tasks of method 10 are implemented in software on that general purpose computing system or performed by a specialized computing system configured to perform the tasks of method 10. In this context, the term "software" refers to sets of machine-readable instructions on a machine-readable medium that are interoperable with a machine to perform the described functions. The machine-readable medium may be a CD-ROM, CD-R, hard disk drive, solid-state drive, another type of optical disk, or flash memory, to name a few options. However, the method may also be implemented in hardware, for example, on a special purpose computer, an embedded device, or an application-specific integrated circuit. In some cases, a number of interconnected computers may be networked and used together to perform the tasks of method 10.

As will be described below in more detail, method 10 may begin with a set of digital panorama pictures, in which two offset two-dimensional images are combined to give the perception of three-dimensional depth. Each pixel in a panorama is assigned a Cartesian three-dimensional coordinate, i.e., (x y z). The collections of pixel coordinate points comprise what is known as a point cloud. This point cloud is the input data set for method 10. The input point cloud may be "noisy" or include data points that do not reflect objects in the images but are artifacts of the data collection.

Method 10 begins at task 12 and continues with task 14, in which a ground plane is detected. Finding a common ground plane provides a basis for other tasks and, in particular, allows other calculations to be performed using only two dimensions of data, rather than all three dimensions. Various methods for image line detection, and more specifically, plane detection, may be used to detect a ground plane.

As one example, a Random Sample Consensus (RANSAC) ground plane detection algorithm may be used in task 14 to find the ground plane, since there are absolute known data parameters, such as the floor of the data set. RANSAC is an iterative method for estimating parameters of a mathematical model from a dataset that contains outliers, e.g., data points that lie at abnormal numerical distances from other values in a random sample.

Three-dimensional RANSAC calculations are machine resource expensive; however, the RANSAC algorithm is suitable for ground plane detection in the disclosed embodiments because the point cloud is not a random sample or data set, and certain assumptions can be made to simplify the process. More specifically, the ground plane is usually the plane defined by the x and y coordinates with the smallest height value, and its size is defined by the greatest and smallest x and y values in the data set. Once the RANSAC process is complete and the ground plane has been detected, method 10 continues with task 16.

In task 16, the point cloud is transformed such that its coordinate system matches the absolute position coordinate system established by Global Positioning System (GPS) and Intertial Navigation System (INS) data. As those of skill in the art will appreciate, the data points in the point cloud initially have coordinates or values that are derived only from their relative positions in the images from which they were extracted. These coordinates typically do not correspond with the actual, absolute positions of any structures in space. Thus, task 16 maps the point cloud coordinates to an absolute position coordinate system, so that further calculations can be performed using absolute position coordinates. This is done by matrix multiplication; each point in the point cloud is multiplied by an appropriate 3×3 rotation matrix to transform it into the GPS coordinate system, e.g.:

$$[X\ Y\ Z] = M[x\ y\ z] \quad (1)$$

In Equation (1) above, [x y z] is the data point in the original coordinate system of the point cloud, M is the transformation matrix, and [X Y Z] represents the final coordinate of the point in the GPS or other absolute position coordinate system. The values in the transformation matrix M may vary from embodiment to embodiment and implementation to implementation. Method 10 may utilize the following equation to calculate M:

$$R(\alpha, \beta, \gamma) = R_z(\alpha) R_y(\beta) R_x(\gamma) = \quad (2)$$

$$R \begin{pmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{pmatrix}$$

In equation (2) above, R is the matrix of transform operators, and Z, Y, and X, correlate to $\alpha$, $\beta$, and $\gamma$ respectively. Each point in the point cloud is subjected to the operation represented in Equations (1) and (2). Once all of the data points have been transformed, method 10 continues with task 18.

Task 18 converts a three-dimensional GPS coordinate set into a two-dimensional histogram. This is done by planar projection onto a two-dimensional plane with dimensions of length and width. The use of a two-dimensional histogram in method 10 has certain advantages over processing the data in three dimensions. For example, mathematical calculations in a two-dimensional space compared to calculations in a three-dimensional space are, on average, logarithmically faster, require fewer resources, and cause less computational overhead. The two-dimensional histogram also facilitates further steps in method 10, allowing the data set to be broken down into smaller segments and used in a Hough transform for line and plane detection, as will be described below in more detail.

Transferring points from a three-dimensional GPS coordinate system into a two-dimensional histogram in this embodiment comprises taking corresponding GPS X and Y values, and applying threshold and region bin values, e.g.:

$$[u\ v\ w] = (\text{integer})(k^*[X\ Y\ Z]) \quad (3)$$

In Equation (3) above, [u v w] is a transferred point from the three-dimensional GPS to the two-dimensional histogram, where u, v and w correspond to X, Y and Z in the GPS coordinate system, respectively. Furthermore, (integer) is a coefficient representing a threshold value, [X Y Z] represents a point in a three-dimensional coordinate space, and k is a coefficient to define the size of a bin. The (integer) may be represented as alpha ($\alpha$).

A bin, as the term is used in this description, refers to a data structure or grouping that associates points with containers. Bins are used in method 10 to identify candidate points—e.g., points that lie close together and are likely to define a single line. The use of bins also helps method 10 to filter some of the noise in the data.

As one example of the use of a bin, in a two dimensional plane of data, candidate points may be arranged into rectangular arrays of maximum size, where each array is a bin. In other cases, bins may be in isolation, such that the bins contain only a single point (e.g., [(1 1)]); two bins may share candidate points (e.g. the arrays [(2 0), (1 0), (0 0)] and [(2 0)(2 1), (1 0)(1 1), (0 0)(0 1)]); and smaller bins may be subsets of larger bins (e.g. the array [(2 0)(2 1)(2 2)], (1 0)(1 1)(1 2), (0 0)(0 1)(0 2)] and the point [(1 1)]), depending on the bin definition implementation. In general, method 10 uses bins to segment an image space into regions and to re-assemble them into an intersecting-plane panorama. The particular use of bins in method 10 will be described below in more detail with respect to task 20.

The values of threshold value, (integer), and bin size, k, may vary from embodiment to embodiment and implementation to implementation. In general, thresholds are values that define the minimum or maximum data values that are considered in a particular task. As will be described below in more detail, thresholds are used in method 10 to screen out noise by avoiding considering collections of points that are below a threshold size, and thus, do not represent meaningful lines. Alternatively, when a bin includes less than a threshold number of points, the bin is discarded as noise. Example thresholds include 5, 10, and 20. The threshold may be selected based on a statistical analysis of the bins.

Figure 3A:
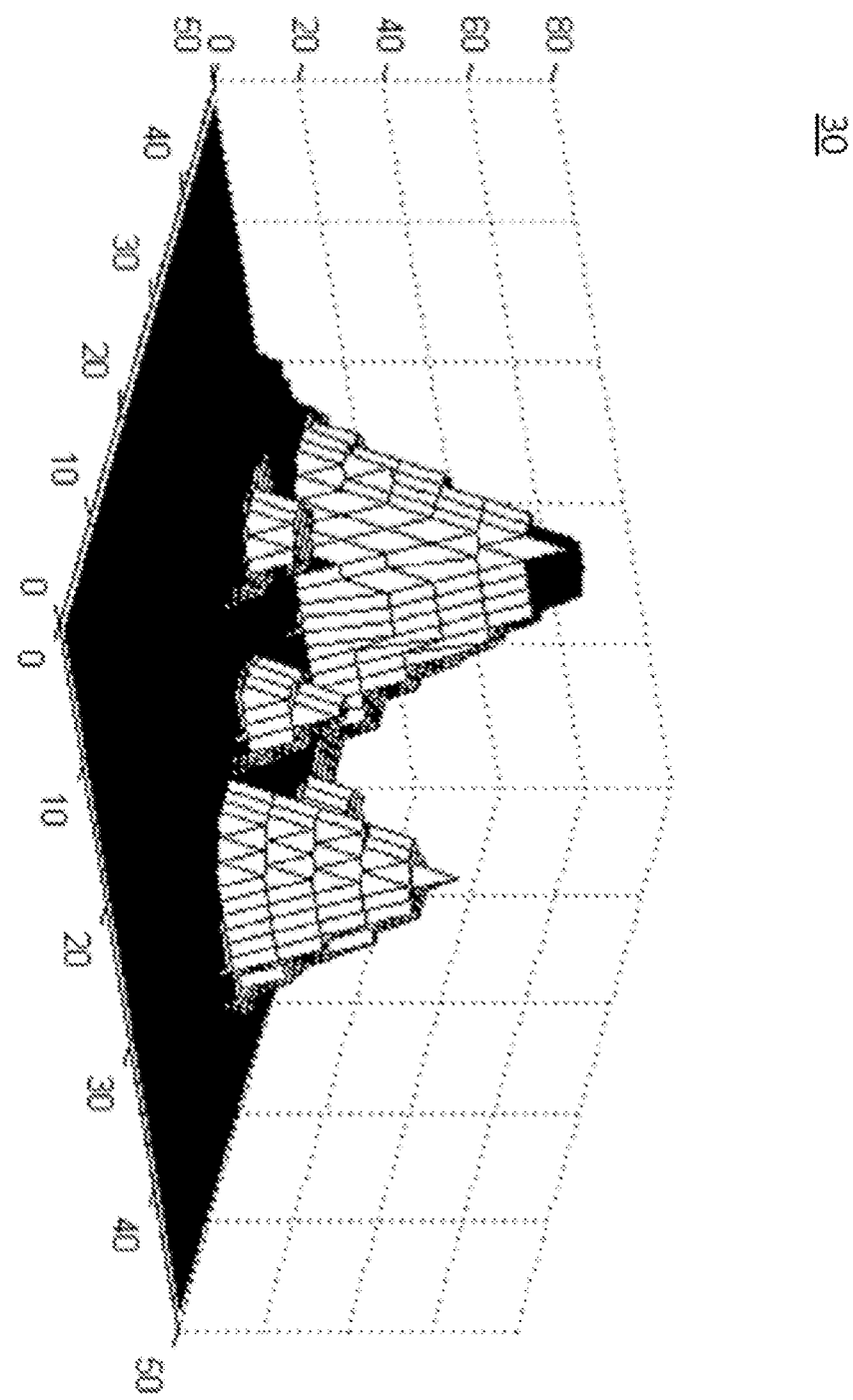
FIG. 3A is a perspective view of an exemplary three-dimensional data set.
Figure 3B:
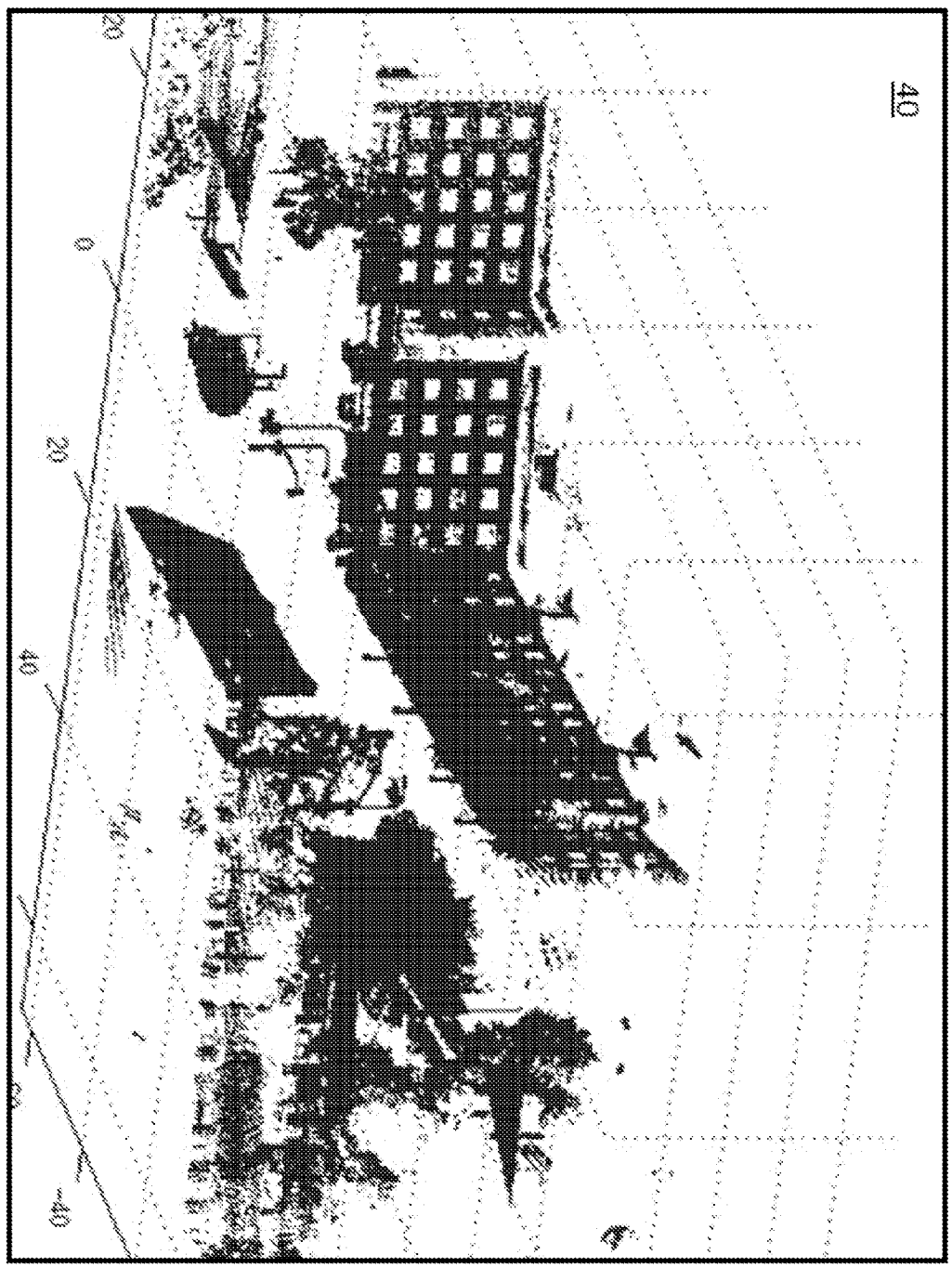
FIG. 3B illustrates an example point cloud of a data set.
Figure 3C:
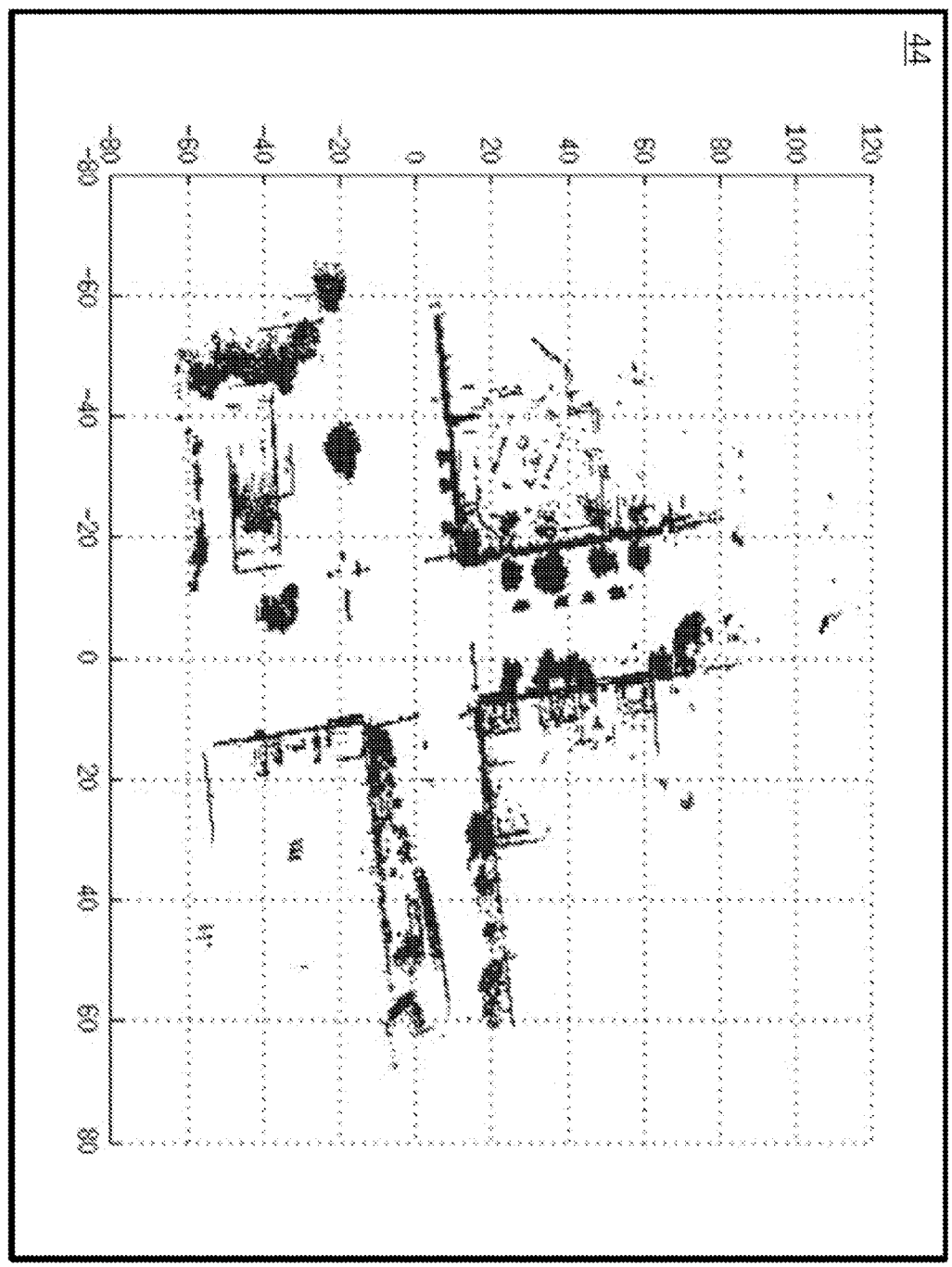
FIG. 3C illustrates a top down view of the point cloud of FIG. 3B.

As one example of a potential result of task 18 of method 10, FIG. 3A illustrates a three-dimensional point cloud or data set 34 in three-dimensional space 30. In FIG. 3A, the points are computer generated and defined by geometric shapes to illustrate an example. FIG. 3B is another illustration of a point cloud 40 derived from sensor data or collected images, which shows the shapes of buildings, trees, light poles, shrubs, and other objects. FIG. 3C illustrates a top down point cloud 44 of point cloud 40, which illustrates more clearly the shape of the intersection an intersection. The scales on FIGS. 3A-3C may represent a distance (e.g., meters, feet) or be scaled values for the purpose of generating and/or displaying the point clouds.

Figure 4:
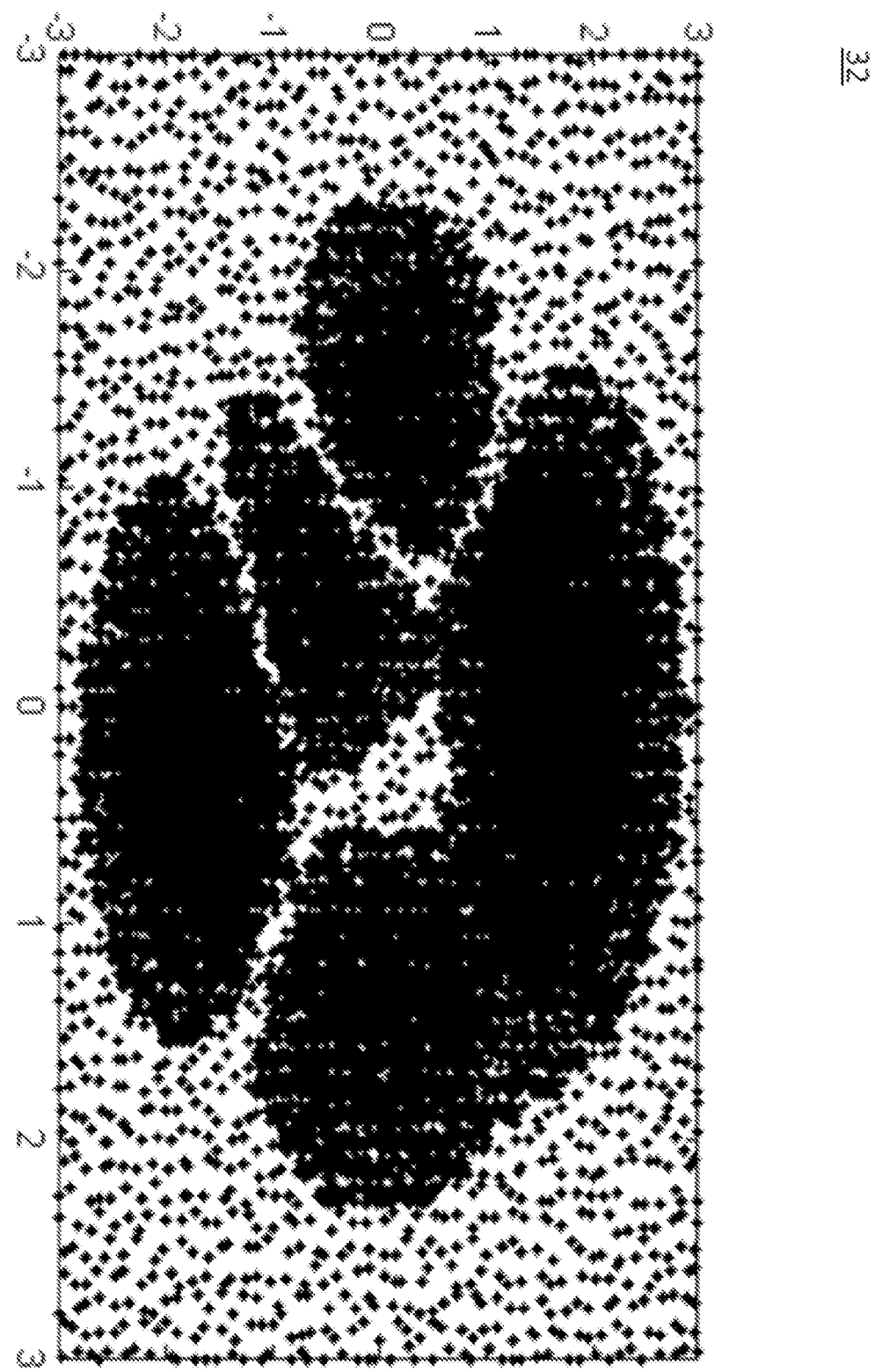
FIG. 4 is an illustration of a two-dimensional histogram generated from the three-dimensional data set of FIG. 3A.

FIG. 4 illustrates a representation of the data set 34 of FIG. 3A as a two-dimensional density histogram 32. It can be seen that when the three-dimensional data set 34 is represented as a two-dimensional density histogram data set 36, points at the outer edges are more scattered, since there are less points at corresponding (x y) values. Similarly, object 36 gets darker and denser towards the middle, since there are more points at corresponding values of (x y). The scale of FIG. 4 may be derived from the scale of the data in the point cloud of FIG. 3A or the scale may be selected to define the proportions of the histogram. For example, the scale may represent the number of standard deviations from a mean of the average values of the data.

In method 10, each point in the three-dimensional GPS system is subjected to the operation represented in Equation (2). Once all of the data points have been transformed, method 10 continues with task 20.

Method 10, task 20, generates a Hough transform from the two-dimensional histogram. Instead of describing a feature, such as a line, through a collection of points $(x_1\ y_1)$, $(x_2\ y_2), (x_3\ y_3), \ldots (x_n\ y_n)$, a Hough transform parameterizes a feature through mathematical linear equations. Specifically, the Hough transform represents a feature in terms of its normal, i.e., the line perpendicular to the feature that extends to the origin (0, 0). That normal is represented as:

$$x \cos \theta + y \sin \theta = \rho \qquad (4)'$$

Figure 5A:
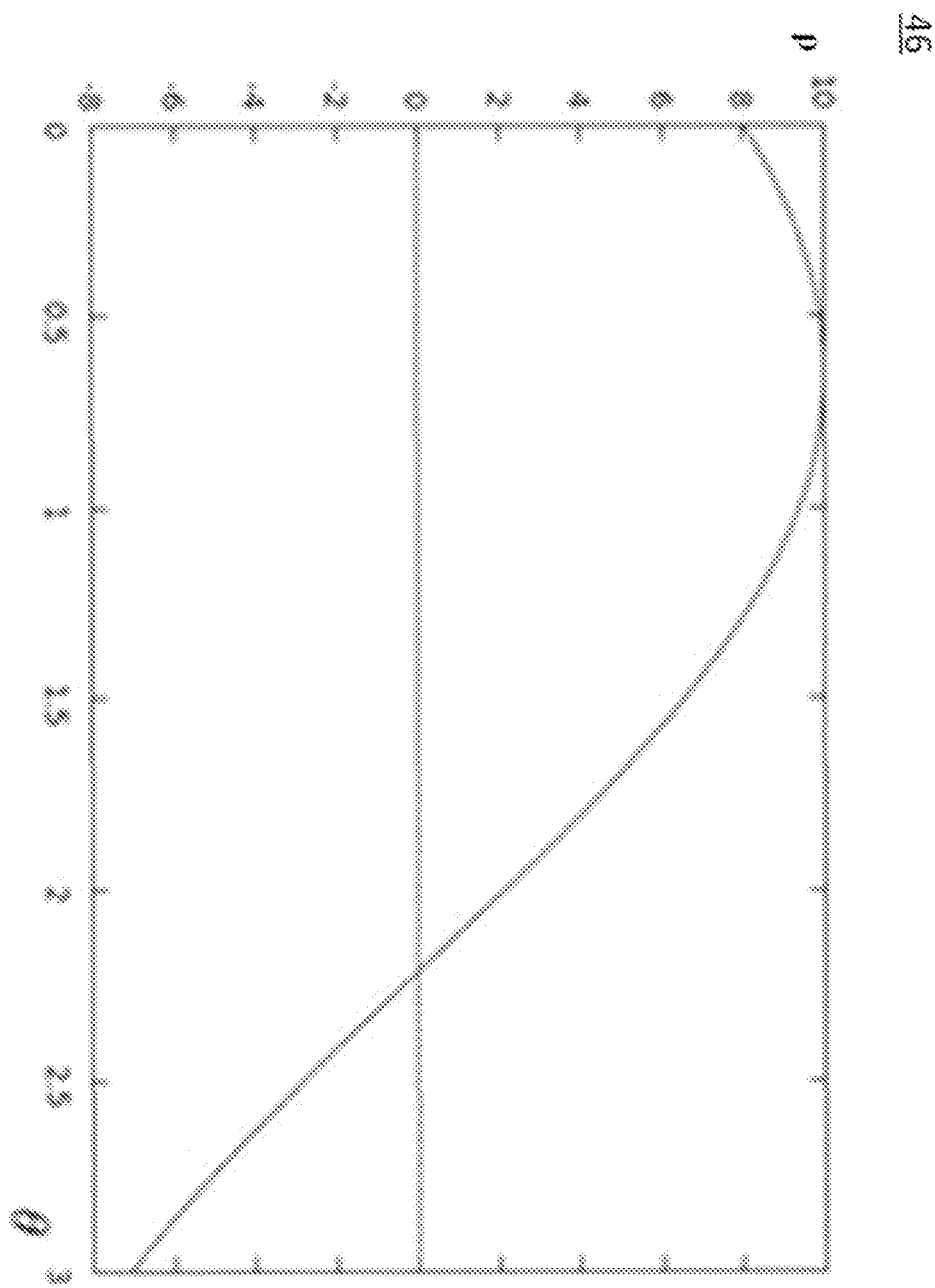
FIG. 5A illustrates an example iteration of values for a Hough transform.

In the equation above, x and y represent two-dimensional coordinates, $\theta$ represents the angle of inclination of the normal, and $\rho$ is the length of the normal. FIG. 5A illustrates a graph 46 as an example curve defined by the length of the normal $\rho$ iterated over theta for an angle range (e.g., from 0 degrees to 360 degrees).

In task 20, in order to perform the Hough transform, method 10 takes each point in the two-dimensional histogram and iterates through values for $\theta$ and $\rho$ in the normal form, as shown by FIG. 5A.

When the Hough transform is complete, each data point in the two-dimensional histogram assembled in task 18 has been described in terms of its normal. A threshold value is applied between the resulting points and collections of neighboring points to determine if they fall into the same bin, or region. Points fall into a bin if they fall within the proximity threshold to form a two-dimensional array (e.g., a single rectangular array). The result of task 20 is then stored in a matrix commonly known as an accumulator. Once the Hough accumulator is created, method 10 continues with task 22. In this description, the transformed data set may be referred to as being in "Hough space."

Figure 5B:
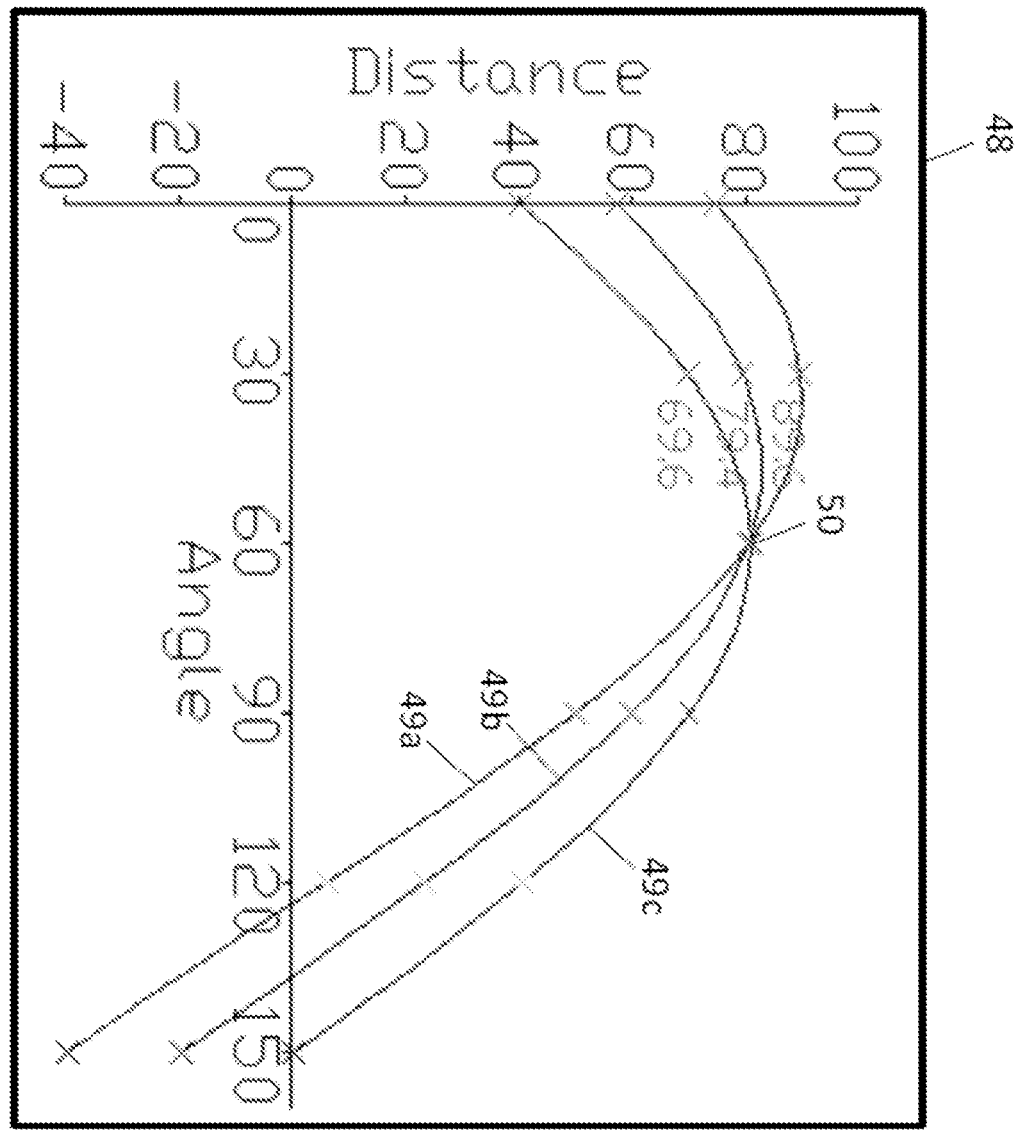
FIG. 5B illustrates an example conversion of point to curves by the Hough transform.

FIG. 5B illustrates a Hough space 48. A point in the XY coordinate system corresponds to a curve in the Hough space. When some number of points in the XY coordinate system are transferred into the Hough space, there are the same number of curves in the Hough space. If the points are collinear in the XY coordinate system, then the curves in the Hough space cross at a point. For example, the curves 49a-c in the Hough space 48 represents points in the XY coordinate system. Because the curves 49a-c intersect at point 50, the corresponding points in the XY coordinate system are collinear. That is, the points in the XY coordinate system fall on the same line or within a specific range of the same line. The specific range may be defined by tolerances of the Hough transform and/or constructions of the curves 49a-c.

Figure 2:
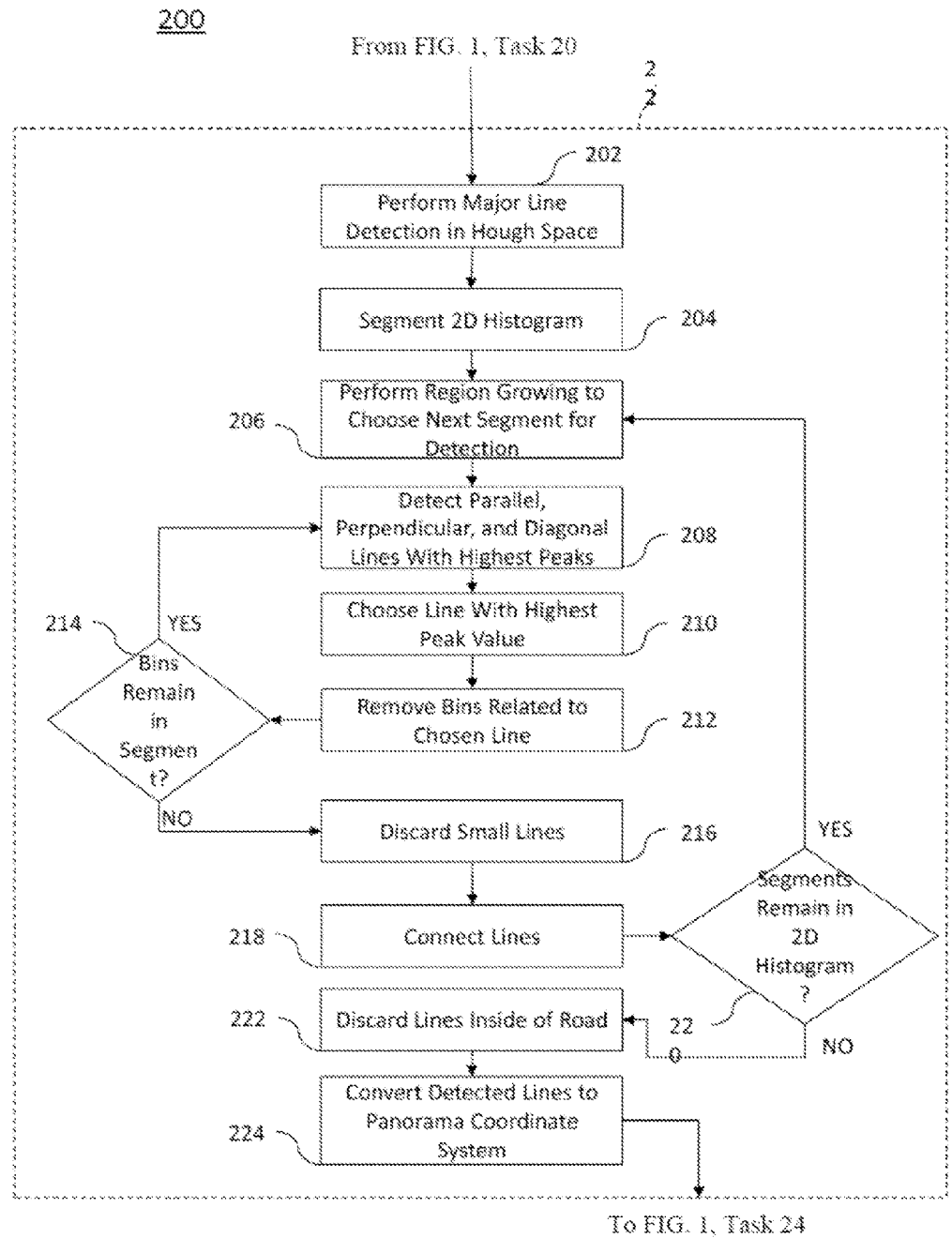
FIG. 2 is a flow diagram of a detailed method for performing line detection in the method of FIG. 1.

Task 22, Hough line detection, involves a number of sub-tasks, and is shown in detail in the flow diagram of FIG. 2. Method 10 utilizes the Hough transform to detect lines and connects those lines to make planes. In the course of task 22, the Hough space is gradually broken into segments for analysis, as will be described below. Once a major vertical line is detected, perpendicular, parallel, and diagonal lines around that line are detected and planes are assembled, iteratively, until all of the data set has been analyzed.

Task 20, sub-task 202 performs line detection for the first major line in a Hough space segment. Initially, the segment comprises the entire Hough space, as the space has not yet been split into individual regions. The initial major line detection sets the basis for orthogonal (i.e. perpendicular), parallel, and diagonal line detection. As was explained above, the data set is initially a random sampling of points in which the only known is the ground plane, established in task 14 of method 10. Further steps of task 20 utilize the initial major line as the baseline for line and plane detection and region growing.

Bins may be given values based on how many points they contain and by the linear length and width of the bins. Length and width may be used so that bins with the same number of points, but different shapes, are assigned different bin values. This is useful because method 10, task 20 deals with detecting lines in order to form planes. For example, a bin that contains 200 points and has a length of 100 points and width of 10 points may, for example, be assigned the value 340. Another bin that contains 200 points and has a length of 20 and width of 10 may be assigned a value of 230. These values are represented as peaks in Hough space. The bin with the largest value or peak is selected as the major line in sub-task 202. A major line may be the direction that most buildings are standing along a street. An image of the building facade may have major lines in the vertical direction.

After the detection of the major line, task 20 continues with sub-task 204. In sub-task 204, the two dimensional histogram is segmented into smaller pieces so that smaller data sets can be used for calculations. This simplifies line and plane detection and allows for faster results.

Segmentation may be done in any number of ways: for example, a data set may be broken up into regions of equal size, regions with bins of similar number and size, or regions with differing number and size, but similar total bin value totals. The bin where the first major line is detected may be considered to be an individual segment in one embodiment. Embodiments may utilize segmentation based on regions with similar bin value totals, since Hough based line detection relies on the size of peaks to determine the existence of lines. Once segmentation is complete, task 20 continues with sub-task 206.

Task 20, subtask 206 is a region algorithm that chooses the next region, or segment, for line detection. Since the object of method 10 is to connect lines to form planes, segments adjacent to the previously detected major line are considered for the next iteration of major line detection. The segment adjacent to the major line with the next highest total peak value is chosen.

Task 20 continues with sub-task 208. Task 208 performs line detection for parallel and perpendicular lines. In this particular embodiment, it is assumed that building facades are parallel to the gravitational pull of Earth's gravity, and that floors and ceilings are perpendicular. Lines in a given set may not always be in a perfect orientation to a major line, e.g., not totally parallel, perpendicular, or diagonal. For that reason, thresholds, such as angle allowances and distances from a major line are defined. These thresholds define a search range relative to each major line, i.e., they define the limits of what method 10 considers to be related to a major line. This will ensure that in further steps of the method 10, related lines are grouped together to form accurate planes.

Sub-task 208 first chooses the highest parallel peak closest to the major peak (e.g., θ−5°<search range<θ+5°). It then chooses the highest peak with an orthogonal angle to the major peak (e.g., θ+90°−5°<search range<θ+90°+5°). Sub-task 208 then chooses the highest peak with diagonal angle to the major peak (e.g., θ+45°−15°<search range<θ+45°+15°). Finally, sub-task 208 identifies the highest peak with negative diagonal angle to the major peak (e.g., θ−45°−15°<search range<θ+45°+15°).

It is not necessary to choose the parallel, orthogonal, and diagonal lines in that order. Lines with the correct orientations and highest peak values in the correct segments are chosen. This allows for the detection of the correct line members of a plane. Moreover, this also allows for the proper determination of the plane shape once the lines are connected in the proper sequence.

Figure 6:
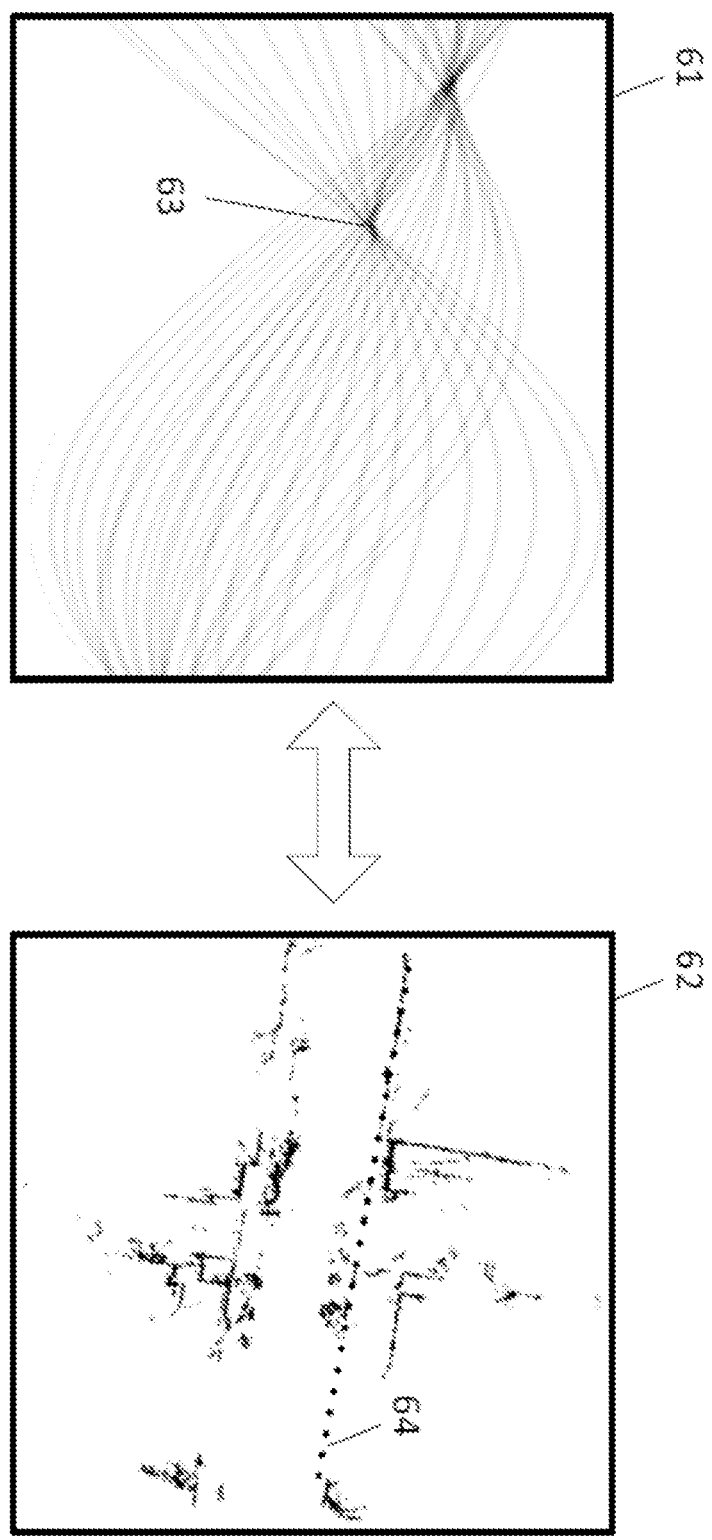
FIG. 6 illustrates an example of line detection by the Hough transform.

FIG. 6 illustrates an example of line detection from the Hough transform. A Hough space 61 is derived from point cloud 62 in the XY coordinate system. The highest parallel peak (e.g., the maximum peak 63) is selected by the computing system from the Hough space 61. The maximum peak 63 may have the most intersect curves or more than a predetermined number of intersecting curves. The predetermined number may be 3, 5, 10, or another value. The corresponding points in the point cloud 62 to the intersecting curves are collinear. That is, the points in the XY coordinate system fall on the same line or within a specific range of the same line. The specific range may be defined by tolerances of the Hough transform and/or constructions of the curves. In FIG. 6, dotted line 64 illustrates the collinear points that correspond to the maximum peak 63.

Task 22 continues with sub-task 210. In this sub-task, the four detected peaks in the previous task are compared and the peak with the largest value is chosen as the next major line. Choosing the next major line from a set of closely neighboring lines with the next largest values increases the chance that two lines are members of the same plane and that they are connected to one another.

Typically, in three-dimensional space, buildings and physical structures are represented as polyhedrons. Polyhedrons are geometric solids with flat faces and straight edges. The flat faces and straight edges of polyhedrons meet at a minimum of 4 vertices, or points of intersection. In order to construct these planes and build a three dimensional representation of a structure in the real world, a major line and the next closest major line in a parallel, perpendicular, or diagonal orientation, have a high probability of connecting with each other to form an edge or intersect at a vertex of a polyhedron face. It is possible that that a major line and distant lines, or lines with smaller peak values, lie in the same plane; however, it is unlikely that they lie on the same edge or come together at the same vertex. Once the line with the highest peak value is detected, task 22 continues with sub-task 212.

In subtask 212, bins related with the chosen line are removed. As described above, a bin may contain or be broken down into a subset of smaller bins. Once a line or lines are identified in a bin, the rest of the points or smaller bins within the major are discarded. Essentially, once a line has been detected, the remaining data points contained in smaller bins of the bin of the major line can be considered to be outliers that do not form a part of the line or lines that have been detected. These remaining data points in a bin can also be considered to be noise, and subtask 212 involves the removal of noise.

There are advantages to removing outliers at this point in method 10, as opposed to later on in the process. For one, this prevents extraneous data left over in the bins from being used to compose false edges or vertices, which would cause erroneous plane shapes. As will be explained in more detail with respect to later sub-tasks of task 22, the line detection algorithm iterates until there are no more bins to consider. Thus, sub-task 212 of task 22 eventually provides the line detection algorithm of task 22 with termination criteria, so that task 22 can continue with cleaning up the panorama and method 10 can continue with other tasks. Computationally, removing outlying data in each iteration of the line detection algorithm speeds up the line detection process because the data set continually shrinks.

Task 22 continues with sub-task 214. Sub-task 214, a decision task, determines if there are more bins that remain in the current segment. If there are more bins, (task 22, sub-task 216:YES), then sub-task 216 returns to task 22, sub-task 208 and considers the last detected major line as the current major line. The next major line in one of the parallel, orthogonal, or diagonal orientations is then detected. The iteration continues until there are no more bins that remain in the current segment, (task 22, sub-task 216:NO). Once the termination condition of sub-task 216 is met, task 22 continues with sub-task 216.

In subtask 216, small lines and bins are removed. In most cases, in addition to a line or lines, there may be other data points and small lines that fall below a threshold in each segment. The threshold used is preferably large enough to avoid removing larger lines, e.g.:

$$t = ar + b \quad (5)$$

Threshold, t, is linearly changed by some distance from the origin, r, where a and b are the constants of the first order equation. Therefore, t is sized at (b) at the origin and proportionally increases according to a distance from the origin by the factor (a). Similar to removing bins and points associated with a detected major line, this sub-task removes noise in a segment so that the desired level of detail is retained in a panorama image once all segments are assembled. In other words, only planes and polyhedrons that are likely to comprise a building or able to be mapped would be retained.

Figure 7:
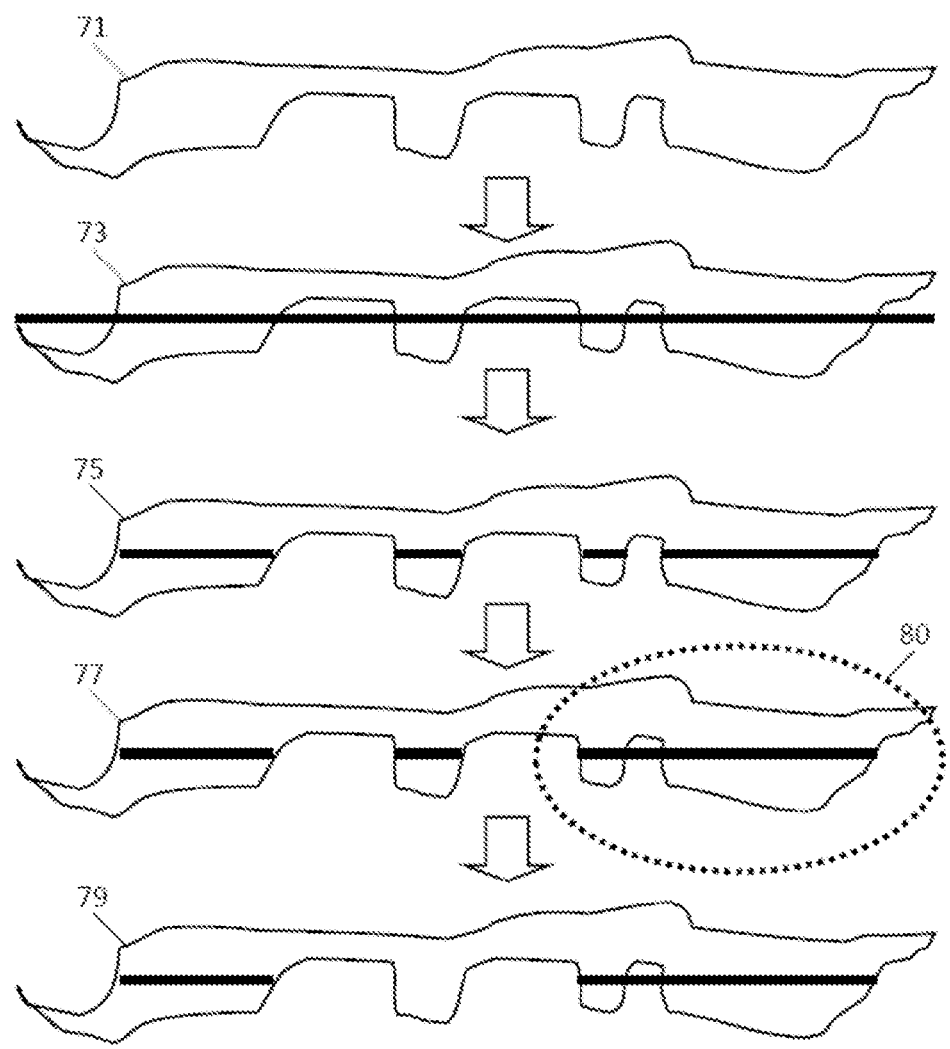
FIG. 7 illustrates an example for connection of lines by the Hough transform.

Task 22 continues with sub-task 218. Sub-task 218 connects the major detected lines to one another in a current segment. This is simply done by examining at the distances between the end points of a major line and another nearest detected major line and creating a line between the points with the smallest distance values. FIG. 7 illustrates a series of steps an example for connection of major detected lines. In act 71, an object is detected in the XY coordinate system. The object may be detected using a region growing algorithm or another image processing technique. In act 73, a major line is detected through transferring the points of the object into the Hough space. For example, the line may be detected by algebraic or geometrically identifying the intersection of lines in the Hough space. In act 75, portion of the major line that do not overlap the object are removed. In act 77, and as illustrated by dotted circle 80, if some of the removed lines are substantially closed in by the object, the adjacent parts of the line may be rejoined. Optionally, in act 79, if remaining portions of the line are less than a threshold, which may be measured by distance (e.g., 0.1 m, 0.5 m, 1.0 m, or another distances) or by number of data points (e.g., 2 data points, 10 data points, 20 data points), then those portions of the lines may be removed.

This may eventually lead to the creation of intersecting planes, leaving gaps or holes in the polyhedrons that represent real world buildings or structures. However, any gaps or holes that may be created in sub-task 214 will be addressed in later steps of method 10. This sub-task, through iterations, leads to the creation of planes and points of intersection in three-dimensional space. The finish of this sub-task marks the completion of a current segment of the Hough space.

Task 22, sub-task 220 is a decision task to determine if there are segments that remain incomplete in the Hough space. If there are incomplete segments, (task 22, sub-task 220:YES), then task 22 returns to subtask 206 to perform region growing by choosing the next segment for detection. Region growing is based on first major line detection, so in the case of choosing the next segment, the current first major line becomes the initial next major line. This next major line has the largest peak value with respect to the previous major line. If there are no more segments left to perform line detection on, (task 22, sub-task 220:NO), then task 22 continues to sub-task 222.

Sub-task 222 discards lines inside of a detected road. In some embodiments, a road may be defined as a single largest plane detected on a ground plane that has no diagonal or perpendicular intersecting planes. Similar to removing small lines associated with a line, removing lines inside of a road cleans up the data set. This is useful so that these lines are not incorrectly used in computations later in method 10, and reduces the amount of data an algorithm needs to iterate through. Once sub-task 22 completes, task 22 continues with sub-task 224.

Task 22, sub-task 224, converts detected lines and created connecting lines in the current segment into lines in the three-dimensional panorama coordinate system. There are various methods for accomplishing this, i.e., taking lines and points from a two-dimensional Hough accumulator matrix and transferring them into three-dimensional space. This embodiment may, however, utilize the known values of x and y for these lines, and use the bin size to recreate the z value. The amalgamation of x, y, and z values are then plotted in the three-dimensional panorama space. The points are then line traced according to line detection and connection results in previous sub-tasks. Once the conversion is complete, method 10 continues to task 24.

Task 24 creates a plane panorama from the lines and planes detected from task 22. Task 24 evaluates all planes created from previous line detection tasks and shades them according to their orientations with horizontal and vertical planes. As is known in the art, shading is the process of altering the colors of objects, planes, and polygons in a three-dimensional scene. Planes may be assigned a color or color variant based on how they are oriented in relation to the horizontal and vertical axes. For example, the ground plane may be shaded with a light green color value and planes parallel to the ground plane may be shaded differing hues of green; planes perpendicular to the ground plane may be shaded a red variant.

Shading planes in a three-dimensional scene allows for an object, such as a polygon, to have clearly definable faces, vertices and edges. On the other hand, not shading planes may remove the appearance of depth i.e., the third dimension. Task 24 may be considered to be optional in some embodiments, depending on a number of factors, including the ultimate use of the result of method 10. For example, if the result of method 10 is intended for human eyes, it may be advantageous to shade the scene. On the other hand, if the result from method 10 will be further processed by machine, shading may not be necessary. Once task 24 has completed Method 10 continues with task 26.

Task 26 performs hole and gap filling. As was noted briefly above, the line and plane detection tasks as described above may not provide perfect objects or structures in a three-dimensional panorama because the original source data, stereoscopic panorama pictures, may contain errors. These errors may range from noisy or blurry photographs, to the presence of objects that, when translated into a three-dimensional bin, are eliminated because they are below the threshold for bin retention. Eliminating objects in front of a building, such as mailboxes or cars, may leave gaps in major planes that make up the building.

Many techniques for hole-filling and surface reconstruction in three-dimensional scenes are possible, and any of which may be used for this task. While choosing any one particular technique may be a trivial task, it is important that the appropriate technique be chosen to retain the desired amount of detail for any given object in a scene, and the technique should have a reasonable computing cost so that performance is not degraded.

Method 10 finds both up and down segmented planes in vertical lines in a panorama image. When the up and down segmented planes are detected, and a down plane is the ground plane, method 10 calculates a bound point (i.e. a cross line) between the up and down segmented planes. Method 10 then fills holes using the up segmented planes and the ground plane using the bound point. After the completion of task 26, method 10 completes and returns at task 28.

As was noted briefly above, once method 10 completes, its result, a plane panorama, may be subjected to further processing. For example, it may be helpful to further process the data to improve its coherence, the registration of the planes, and the correspondence of the planes with real, physical locations. Methods for performing such tasks are disclosed in related U.S. Provisional Patent Application Nos. 61/679,009 and 61/683,342, filed on Aug. 2, 2012, entitled "Plane Panorama Location Correction in Three-Dimensional Mapping," and U.S. Non-provisional Application entitled "Plane Panorama Location Correction in Three-Dimensional Mapping," (Docket No. NC58902US and 10171-13022) filed on Jul. 30, 2013, the contents of which are incorporated by reference in their entirety.

Figure 8:
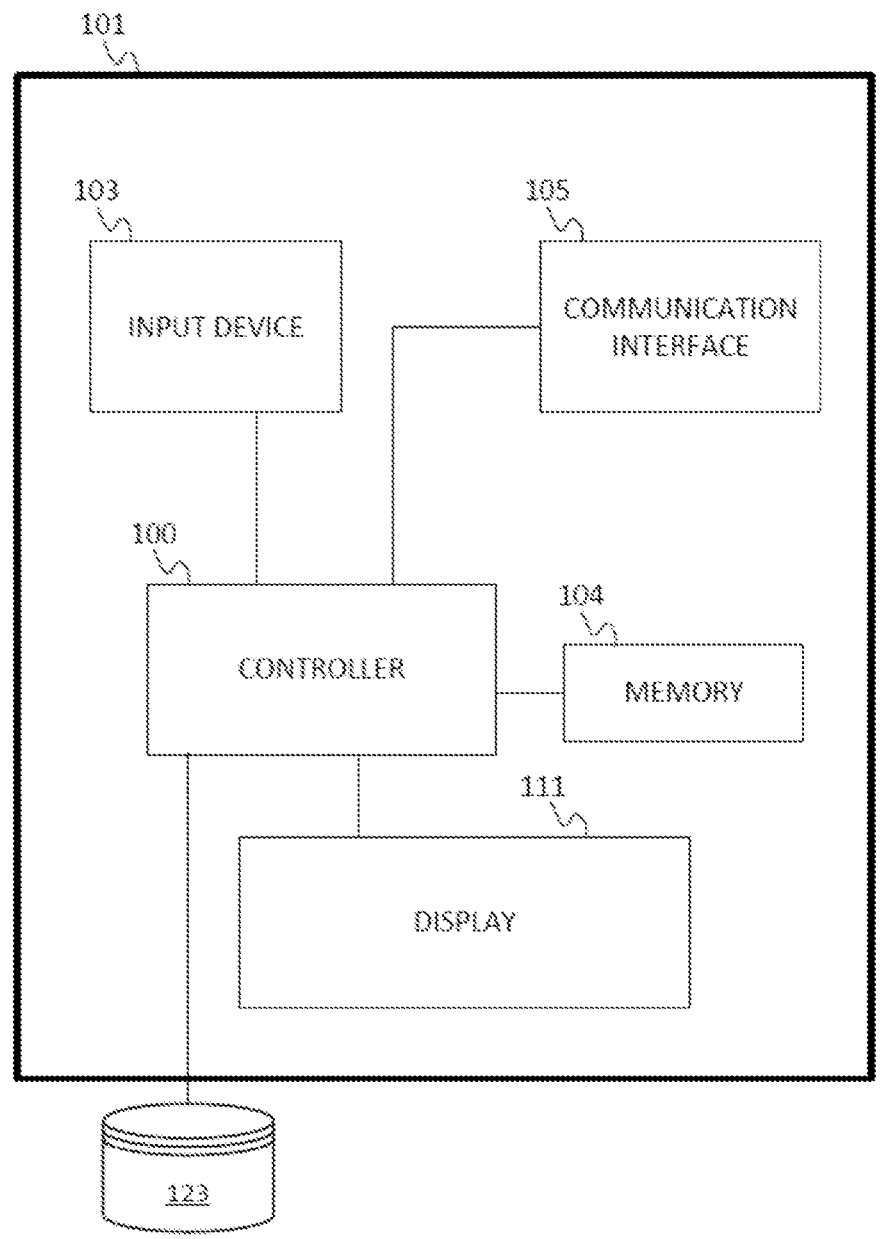
FIG. 8 is an example computing system for three-dimensional plane panorama creation through Hough-based line detection.

FIG. 8 is an example computing device 101 for three-dimensional plane panorama creation through Hough-based line detection. The computing device 101 includes a controller 100, an input device 103, a memory 104, a communication interface 105, a display 111, and a database 123. Additional, different, or fewer components may be provided.

The memory 104 or database 123 is configured to store a three-dimensional point cloud. The three-dimensional point cloud includes image data associated with location data. For example, each pixel in the image data is assigned a three-dimensional coordinate. The association of individual pixels to the coordinates may involve a variety of techniques. In one example, spherical epipolar images two camera images. The camera images may be fish-eye camera images. Stereo image matching is performed between the two camera images. The range of each pixel that was stereo matched is calculated by the controller 100. Based on the range and the view angle of the pixel, a three-dimensional point is calculated and projected with respect to a center point to create a range panorama.

The communication interface 105 may receive the three-dimensional point cloud from another device that generates the point cloud or the three-dimensional point cloud may be generated by the controller 100.

The controller 100 is configured to analyze the point cloud to detect a ground plane. The ground plane may be the horizontal plane having a predetermined number of points and the smallest height.

The controller 100 is configured to convert the three-dimensional point cloud to a two-dimensional histogram with bins grouping neighboring points in the three-dimensional point cloud. In one example, points in the point cloud are projected onto a plane. The plane may be a horizontal plane or a plane at an angle to the horizontal.

The controller 100 is configured to represent the projected points based on a normal line that extends from an individual projected point to an origin in the plane. The projected points are described by the length of the normal line and an angle of the normal line. The angle for the normal line may be measured from the X-axis, the Y-axis, or another frame of reference. In one example, the representation of projected points in terms of the normal line is a Hough transformation.

The controller 100 is configured to segment the resulting points into segments, which may be a Hough accumulator matrix. The segments are analyzed to perform line detection. The controller 100 discards points that are outliers, do not lie within a predetermined distance to one or more detected lines, or otherwise are considered noisy or extraneous. The predetermined distance, which may be configured by the user (e.g., through input device 103), may be defined based on a geographic distance, a number of pixels, or a percentage of the size of the segment.

The controller 100 is configured to assemble the one or more lines into one or more planes. The controller 100 is configured to assemble lines and/or planes into images. Lines that are smaller than a threshold size may be discarded. A plane may be defined as any closed shape. Any three or more lines that intersect at three or more vertices may form a closed shape. The display 111 is configured to present the assembled planes or images, which may be shaded, colored, or otherwise rendered to resemble physical objects. The controller 100 is also configured to perform the acts illustrated by FIG. 6 and described above.

The memory 104 may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The input device 103 may be one or more buttons, keypad, keyboard, mouse, stylist pen, trackball, rocker switch, touch pad, voice recognition circuit, or other device or component for inputting data to the computing device 101. The input device 103 and the display 111 may be combined as a touch screen, which may be capacitive or resistive. The display 111 may be a liquid crystal display (LCD) panel, light emitting diode (LED) screen, thin film transistor screen, or another type of display.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention. While the invention has been described with respect to certain embodiments, the embodiments are intended to be exemplary, rather than limiting. Modifications and changes may be made within the scope of the invention.

What is claimed is:

1. A method of constructing a three-dimensional plane panorama, comprising:
   detecting a ground plane in a three-dimensional point cloud;

converting the three-dimensional point cloud to a two-dimensional histogram with bins grouping neighboring points in the three-dimensional point cloud;

performing a Hough transformation on the two dimensional histogram to create a Hough accumulator matrix;

segmenting the Hough accumulator matrix into one or more segments, each segment including one or more of the bins;

iteratively performing line detection in each of the one or more segments;

discarding, as one or more lines are detected in the one or more segments, neighboring points in each of the bins that do not lie along the one or more lines;

discarding one or more lines from the line detection based on a threshold size, wherein the threshold size is a function of a distance from an origin; and assembling the one or more lines into one or more planes.

2. The method of claim 1, further comprising assembling the one or more planes into a plane panorama.

3. The method of claim 1, further comprising performing one or both of gap or hole filling on the one or more planes.

4. The method of claim 1, further comprising, prior to said converting, transforming the three-dimensional point cloud from a relative coordinate system to an absolute position coordinate system.

5. The method of claim 4, wherein the absolute position coordinate system is established using Global Positioning System (GPS) data associated with the three-dimensional point cloud.

6. The method of claim 1, wherein said detecting the ground plane uses a Random Sample Consensus (RANSAC) algorithm.

7. The method of claim 1, wherein said iteratively performing line detection continues until line detection has been performed on all of the bins.

8. The method of claim 1, wherein said iteratively performing line detection comprises:
    detecting a first major line;
    detecting one or more related lines that are orthogonal, parallel or diagonal with respect to the first major line;
    choosing a largest one of the one or more related lines;
    discarding outlying data from ones of the bins containing data related to the first major line and the one or more related lines; and
    choosing a largest one of the one or more related lines as a next major line.

9. The method of claim 1, wherein said converting the three-dimensional point cloud to the two-dimensional histogram further comprises discarding points in the three-dimensional point cloud that do not meet a predefined threshold.

10. An apparatus comprising:
    at least one processor; and
    at least one memory including computer program code for one or more programs, the at least one memory and the computer program code configured to, with the at least one processor, cause the apparatus to perform at least the following:
    detecting a ground plane in a three-dimensional point cloud;
    converting the three-dimensional point cloud to a two-dimensional histogram with bins grouping neighboring points in the three-dimensional point cloud;
    performing a Hough transformation on the two dimensional histogram to create a Hough accumulator matrix;
    segmenting the Hough accumulator matrix into one or more segments, each segment including one or more of the bins;
    iteratively performing line detection in each of the one or more segments;
    discarding, as one or more lines are detected in the one or more segments, neighboring points in each of the bins that do not lie along the one or more lines;
    discarding one or more lines from the line detection based on a threshold size, wherein the threshold size is a function of a distance from an origin; and
    assembling the one or more lines into one or more planes.

11. The apparatus of claim 10, the computer program code further configured to perform:
    assembling the one or more planes into a panoramic image.

12. The apparatus of claim 10, the computer program code further configured to perform:
    performing gap filling on the one or more planes to complete a polyhedron representing a structure.

13. The apparatus of claim 10, the computer program code further configured to perform:
    transforming the three-dimensional point cloud from a relative coordinate system to an absolute position coordinate system.

14. The apparatus of claim 13, wherein the absolute position coordinate system is established using Global Positioning System (GPS) data associated with the three-dimensional point cloud.

15. The apparatus of claim 10, wherein iteratively performing line detection comprises:
    detecting a first major line;
    detecting one or more related lines that are orthogonal, parallel or diagonal with respect to the first major line;
    choosing a largest one of the one or more related lines;
    discarding outlying data from ones of the bins containing data related to the first major line and the one or more related lines; and
    choosing a largest one of the one or more related lines as a next major line.

* * * * *